United States Patent
Azuma et al.

(10) Patent No.: US 11,769,909 B2
(45) Date of Patent: Sep. 26, 2023

(54) NONAQUEOUS ELECTROLYTE SECONDARY BATTERY POROUS LAYER

(71) Applicant: Sumitomo Chemical Company, Limited, Tokyo (JP)

(72) Inventors: Yuichiro Azuma, Osaka (JP); Kensaku Horie, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 271 days.

(21) Appl. No.: 16/849,281

(22) Filed: Apr. 15, 2020

(65) Prior Publication Data

US 2020/0335820 A1  Oct. 22, 2020

(30) Foreign Application Priority Data

Apr. 16, 2019 (JP) ................................. 2019-078118

(51) Int. Cl.
| | |
|---|---|
| *H01M 10/0565* | (2010.01) |
| *H01M 50/46* | (2021.01) |
| *H01M 50/489* | (2021.01) |
| *H01M 50/491* | (2021.01) |
| *H01M 50/423* | (2021.01) |
| *H01M 50/417* | (2021.01) |
| *H01M 50/451* | (2021.01) |

(52) U.S. Cl.
CPC ..... *H01M 10/0565* (2013.01); *H01M 50/417* (2021.01); *H01M 50/423* (2021.01); *H01M 50/451* (2021.01); *H01M 50/46* (2021.01); *H01M 50/489* (2021.01); *H01M 50/491* (2021.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 5,464,928 A | * | 11/1995 | Chang | ................ C08G 73/1085 528/229 |
| 2003/0189270 A1 | * | 10/2003 | Wandel | ...................... D01F 6/90 264/211.22 |
| 2008/0050663 A1 | * | 2/2008 | Kawakami | ............. B41M 5/267 430/14 |
| 2009/0176147 A1 | | 7/2009 | Tatanaka et al. | |
| 2010/0178544 A1 | | 7/2010 | Nishikawa | |
| 2010/0261069 A1 | | 10/2010 | Nakura | |
| 2017/0141372 A1 | * | 5/2017 | Suzuki | .............. H01M 10/0525 |
| 2017/0288281 A1 | * | 10/2017 | Chiang | ............. H01M 10/4235 |
| 2018/0175353 A1 | | 6/2018 | Sakimoto et al. | |

FOREIGN PATENT DOCUMENTS

| | | |
|---|---|---|
| CN | 101779311 A | 7/2010 |
| CN | 107683301 A | 2/2018 |
| JP | 2007194203 A | 8/2007 |
| JP | 2009146822 A | 7/2009 |
| JP | 2010-55942 A | 3/2010 |

OTHER PUBLICATIONS

Kevlar-Polyaramide, available at http://polymerdatabase.com/polymers/kevlar.html (Year: 2016).*
Office Action dated Mar. 3, 2023 in CN Application No. 202010300022.5.

* cited by examiner

*Primary Examiner* — Anca Eoff
(74) *Attorney, Agent, or Firm* — Panitch Schwarze Belisario & Nadel LLP

(57) ABSTRACT

An aspect of the present invention achieves a nonaqueous electrolyte secondary battery porous layer that has both favorable ion permeability and favorable heat resistance despite being thin. A nonaqueous electrolyte secondary battery porous layer in accordance with an aspect of the present invention has a thickness of less than 8 μm and an elastic modulus in a shear direction of not less than 16 GPa.

10 Claims, 1 Drawing Sheet

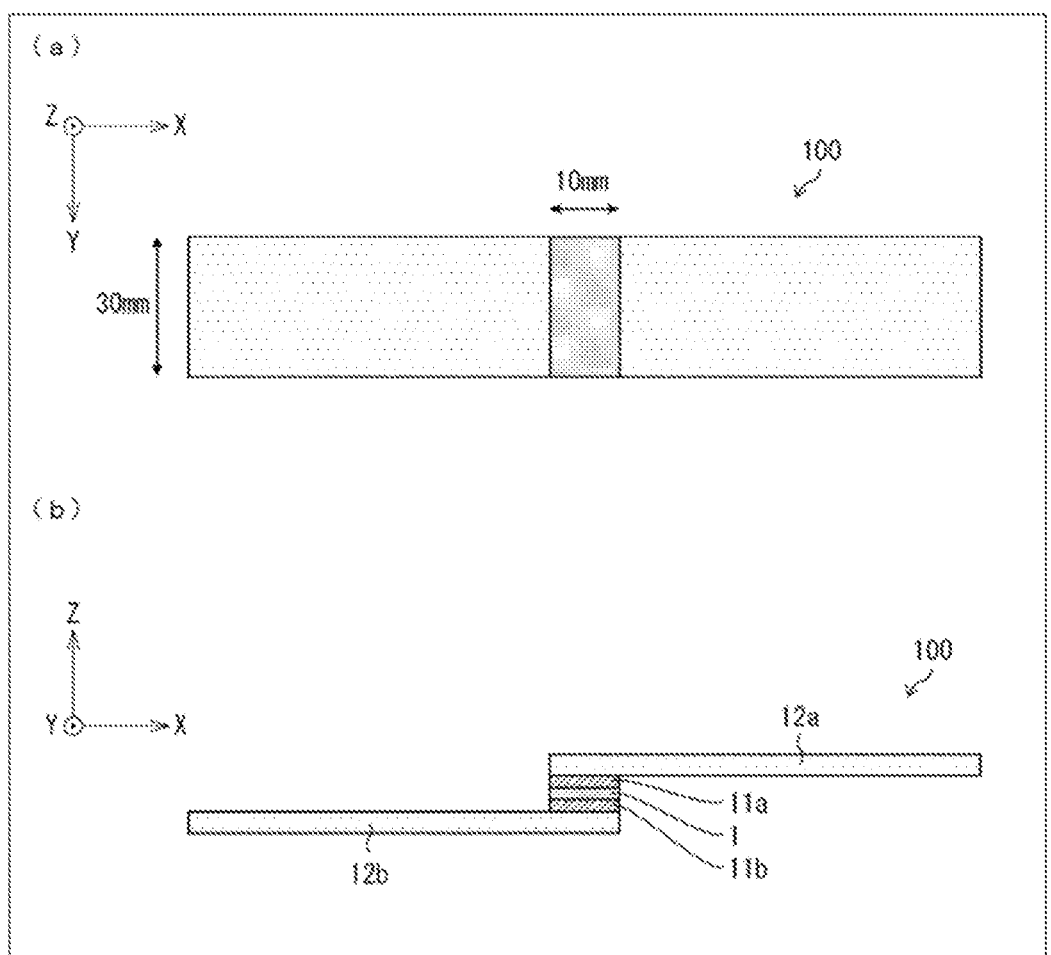

NONAQUEOUS ELECTROLYTE SECONDARY BATTERY POROUS LAYER

This Nonprovisional application claims priority under 35 U.S.C. § 119 on Patent Application No. 2019-078118 filed in Japan on Apr. 16, 2019, the entire contents of which are hereby incorporated by reference.

TECHNICAL FIELD

The present invention relates to a porous layer for a nonaqueous electrolyte secondary battery (hereinafter referred to as a "nonaqueous electrolyte secondary battery porous layer").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

As a member of such a nonaqueous electrolyte secondary battery, a separator having excellent heat resistance is under development. For example, in known art such as that of Patent Literature 1, there are laminated separators in which a porous layer containing a heat-resistant resin is formed on a base material.

CITATION LIST

Patent Literature

[Patent Literature 1]
Japanese Patent Application Publication Tokukai No. 2010-55942

SUMMARY OF INVENTION

Technical Problem

Recently, as battery capacity has increased, there has been a demand for further decreases in the thickness of separators. However, further decreases in the thickness of a porous layer containing a heat-resistant resin have made it even more difficult to achieve both favorable ion permeability and favorable heat resistance. Prior art such as that described above has room for improvement in terms of achieving both favorable ion permeability and favorable heat resistance while also having a thinner separator.

An object of an aspect of the present invention is to achieve a nonaqueous electrolyte secondary battery porous layer which has both favorable ion permeability and favorable heat resistance despite being thin.

Solution to Problem

In order to solve the above problem, as a result of diligent research, the inventor of the present invention arrived at the present invention after discovering that it is possible to achieve both favorable ion permeability and favorable heat resistance by controlling a shear direction elastic modulus of a nonaqueous electrolyte secondary battery porous layer to fall within a specific range. The present invention includes the following aspects.

<1> A nonaqueous electrolyte secondary battery porous layer, the nonaqueous electrolyte secondary battery porous layer having a thickness of less than 8 μm and an elastic modulus in a shear direction of not less than 16 GPa.

<2> The nonaqueous electrolyte secondary battery porous layer according to <1>, wherein the nonaqueous electrolyte secondary battery porous layer has a porosity of 20% by volume to 90% by volume.

<3> The nonaqueous electrolyte secondary battery porous layer according to <1> or <2>, wherein the nonaqueous electrolyte secondary battery porous layer contains at least one resin selected from a group consisting of a resin having a melting point or a glass transition temperature of not lower than 180° C., a polyamide-based resin, a polyimide-based resin, and a polyester-based resin.

<4> The nonaqueous electrolyte secondary battery porous layer according to <1> or <2>, wherein the nonaqueous electrolyte secondary battery porous layer contains a polyamide-based resin.

<5> A nonaqueous electrolyte secondary battery laminated separator including: a polyolefin porous film; and the nonaqueous electrolyte secondary battery porous layer according to any one of <1> to <4>, the nonaqueous electrolyte secondary battery porous layer being formed on at least one surface of the polyolefin porous film.

<6> A nonaqueous electrolyte secondary battery member including: a positive electrode; the nonaqueous electrolyte secondary battery porous layer according to any one of <1> to <4> or the nonaqueous electrolyte secondary battery laminated separator according to <5>; and a negative electrode, the positive electrode, the nonaqueous electrolyte secondary battery porous layer or the nonaqueous electrolyte secondary battery laminated separator, and the negative electrode being arranged in this order.

<7> A nonaqueous electrolyte secondary battery including: the nonaqueous electrolyte secondary battery porous layer according to any one of <1> to <4> or the nonaqueous electrolyte secondary battery laminated separator according to <5>.

Advantageous Effects of Invention

An aspect of the present invention makes it possible to provide a nonaqueous electrolyte secondary battery porous layer which has both favorable ion permeability and favorable heat resistance despite being thin.

BRIEF DESCRIPTION OF DRAWINGS

The Figure is a diagram schematically illustrating a test piece used in measurement of elastic modulus in a shear direction.

DESCRIPTION OF EMBODIMENTS

The following description will discuss embodiments of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by combining technical means disclosed in differing embodiments.

Any numerical range expressed as "A to B" herein means "not less than A and not more than B" unless otherwise stated.

[1. Nonaqueous Electrolyte Secondary Battery Porous Layer]

A nonaqueous electrolyte secondary battery porous layer in accordance with an embodiment of the present invention has a thickness of less than 8 μm and an elastic modulus in a shear direction of not less than 16 GPa. Hereinafter, a nonaqueous electrolyte secondary battery porous layer may also be referred to simply as a "porous layer". The elastic modulus in the shear direction may also be referred to simply as a "shear modulus".

The porous layer, as a member included in a nonaqueous electrolyte secondary battery, can be provided between (i) a polyolefin porous film and (ii) at least one of a positive electrode and a negative electrode. The porous layer can be provided on one surface of the polyolefin porous film or on both surfaces of the polyolefin porous film. Alternatively, the porous layer can be provided on an active material layer of at least one of the positive electrode and the negative electrode. Alternatively, the porous layer can be provided between (i) the polyolefin porous film and (ii) at least one of the positive electrode and the negative electrode, in a manner so as to be in contact with the polyolefin porous film and the at least one of the positive electrode and the negative electrode. The number of porous layer(s) provided between (i) the polyolefin porous film and (ii) at least one of the positive electrode and the negative electrode can be one, two, or more. The porous layer is preferably an insulating porous layer containing a resin.

In a case where the porous layer is formed on one surface of the polyolefin porous film, the porous layer is preferably formed on a surface of the polyolefin porous film which surface faces the positive electrode. The porous layer is more preferably formed on a surface which makes contact with the positive electrode.

The porous layer is provided in the nonaqueous electrolyte secondary battery so as to be in contact with the polyolefin porous film, and functions as a heat-resistant layer. In other words, when the nonaqueous electrolyte secondary battery is exposed to high temperature and the polyolefin porous film shrinks, porous layer serves a function of preventing in-plane shrinkage of the polyolefin porous film and runaway of the battery. If the porous layer has a shear modulus of not less than 16 GPa, the porous layer will be able to reduce or prevent in-plane shrinking of the polyolefin porous film. If the porous layer has a shear modulus of not less than 16 GPa and a thickness of less than 8 μm, the porous layer will be able to have high heat resistance and favorable ion permeability. The shear modulus of the porous layer is preferably not less than 17 GPa and more preferably not less than 20 GPa.

The Figure is a diagram schematically illustrating a test piece used in measurement of shear modulus. (b) of the Figure illustrates the test piece as viewed from the Y-axis direction of (a) of the Figure. As illustrated in the Figure, the test piece 100 is constituted by a resin substrate 12a, double-sided tape 11a, a porous layer 1, double-sided tape 11b, and a resin substrate 12b, stacked in this order. In conformity with the test method of JIS K6850, the shear modulus is found as follows. The test piece used includes a porous layer measuring 10 mm (in the lengthwise direction of the test piece) by 30 mm (in the widthwise direction of the test piece). The test piece is pulled along the lengthwise direction at a pulling speed of 50 mm/s. The elastic modulus is calculated from the slope of a stress-strain curve observed during the test. The shear modulus is the average value obtained from two measurements. Further details about the measurement method are provided in the discussion of the Examples (described later).

It is preferable that the resin used in the porous layer be insoluble in the electrolyte of the nonaqueous electrolyte secondary battery and be electrochemically stable when the battery is in normal use.

Examples of resin(s) used in the porous layer encompass polyolefins; (meth)acrylate-based resins; fluorine-containing resins; polyamide-based resins; polyimide-based resins; polyester-based resins; rubbers; resins having a melting point or a glass transition temperature of not lower than 180° C.; water-soluble polymers; polycarbonate, polyacetal, and polyether ether ketone.

As the polyamide-based resins, aramid resins such as aromatic polyamides and wholly aromatic polyamides are preferable.

Specific examples of the aramid resins encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide) is more preferable.

The polyester-based resins are preferably aromatic polyesters such as polyarylates, or liquid crystal polyesters.

Examples of the rubbers encompass a styrene-butadiene copolymer and a hydride thereof, a methacrylic acid ester copolymer, an acrylonitrile-acrylic acid ester copolymer, a styrene-acrylic acid ester copolymer, an ethylene propylene rubber, and polyvinyl acetate.

Examples of the fluorine-containing resins encompass polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer, and particularly fluorine-containing rubber having a glass transition temperature of not higher than 23° C.

Examples of the resins having a melting point or a glass transition temperature of not lower than 180° C. encompass polyphenylene ether, polysulfone, polyether sulfone, polyphenylene sulfide, polyetherimide, polyamide imide, polyether amide, and polyether ether ketone.

Examples of the water-soluble polymers encompass polyvinyl alcohol, polyethylene glycol, cellulose ether, sodium alginate, polyacrylic acid, polyacrylamide, and polymethacrylic acid.

Among these resins, the following resins are more preferable in terms of heat resistance: resins having a melting point or a glass transition temperature of not lower than 180° C.; polyamide-based resins; polyimide-based resins; and polyester-based resins.

The porous layer may contain only one of the above resins or two or more of the above resins in combination.

The porous layer may contain a filler. The filler may be an inorganic filler or an organic filler. An inorganic filler made of an inorganic oxide such as silica, calcium oxide, magnesium oxide, titanium oxide, alumina, mica, zeolite, aluminum hydroxide, or boehmite is more preferable. The filler has a particle diameter of preferably not more than 1 µm, more preferably 0.01 µm to 0.5 µm, and even more preferably 0.015 µm to 0.25 µm. A particle diameter of not more than 1 µm makes it easy for resin to fill spaces between filler particles and thus tends to improve shear modulus.

The amount of resin contained in the porous layer, i.e., the amount of resin with respect to a total amount of filler and resin, is preferably not less than 40 weight %, more preferably not less than 50 weight %, and even more preferably not less than 70 weight %. Setting the contained amount of resin to be not less than 40 weight % makes it more likely that the porous layer will have a structure in which the resin is three-dimensionally continuously connected. This makes it possible to improve the shear modulus.

The amount of resin contained in the porous layer is preferably not more than 95 weight %, more preferably not more than 90 weight %, and even more preferably not more than 85 weight %.

A contained amount of the filler is preferably 5 weight % to 60 weight %. When the contained amount of filler is not less than 5 weight %, the filler strengthens mechanical properties of the porous layer. This tends to improve the shear modulus. Furthermore, the amount of filler being not less than 5 weight % results in suitable voids in the porous layer containing the filler and resin, which makes it possible to obtain a porous layer exhibiting favorable ion permeability.

The porous layer is preferably provided between the polyolefin porous film and a positive electrode active material layer of the positive electrode. The descriptions below of the physical properties of the porous layer describe at least the physical properties of a porous layer disposed between the polyolefin porous film and the positive electrode active material layer of the positive electrode in a nonaqueous electrolyte secondary battery.

The porous layer has a thickness of preferably less than 8 µm, more preferably not more than 5 µm, and even more preferably not more than 3 µm, per one porous layer. Setting the thickness of the porous layer to be less than 8 µm (per one porous layer) decreases resistance to lithium ion permeation in the nonaqueous electrolyte secondary battery and therefore makes it possible to reduce a decrease in a rate characteristic and cycle characteristic. Setting the thickness of the porous layer to be less than 8 µm (per one porous layer) also reduces an increase in distance between the positive electrode and negative electrode, and therefore makes it possible to reduce a decrease in the internal volume efficiency of the nonaqueous electrolyte secondary battery. The thickness of the porous layer is preferably not less than 0.5 µm and more preferably not less than 1 µm, per one porous layer. The porous layer having a thickness of not less than 0.5 µm (per one porous layer) makes it possible to sufficiently prevent an internal short circuit caused by e.g. damage to the nonaqueous electrolyte secondary battery, and also to retain a sufficient amount of the electrolyte in the porous layer. Setting the thickness of the porous layer (thickness per one porous layer) to be within the above range makes it possible to achieve high energy density. The porous layer in accordance with an embodiment of the present invention is thin as described above. This allows the porous layer to have favorable ion permeability in addition to superior heat resistance.

The weight per unit area of the porous layer can be appropriately determined in view of the strength, film thickness, weight, and handleability of the porous layer. The weight per unit area of the porous layer is preferably 0.5 $g/m^2$ to 20 $g/m^2$, and more preferably 0.5 $g/m^2$ to 10 $g/m^2$, per one porous layer. A porous layer having a weight per unit area within the above numerical ranges allows a nonaqueous electrolyte secondary battery including the porous layer to have a higher weight energy density and a higher volume energy density. A porous layer whose weight per unit area exceeds the above ranges tends to cause a nonaqueous electrolyte secondary battery to be heavy.

The porous layer has a porosity of preferably 20% by volume to 90% by volume, and more preferably 30% by volume to 80% by volume, in order to achieve sufficient ion permeability. The pores in the porous layer have a diameter of preferably not more than 1.0 µm, and more preferably not more than 0.5 µm. In a case where the pores each have such a diameter, the porous layer can achieve sufficient ion permeability in a nonaqueous electrolyte secondary battery.

[2. Method of Producing Nonaqueous Electrolyte Secondary Battery Porous Layer]

The porous layer can be formed with use of a coating solution which is obtained by (i) dissolving or dispersing resin in a solvent and (ii) dispersing a filler in the solvent. The solvent can be described as both a solvent in which the resin is dissolved and a dispersion medium in which the resin or filler is dispersed. Examples of a method for forming the coating solution encompass a mechanical stirring method, an ultrasonic dispersion method, a high-pressure dispersion method, and a media dispersion method.

The porous layer can be formed by, for example, the following methods: (i) applying the coating solution directly to a surface of a base material and then removing the solvent, (ii) applying the coating solution to a suitable support, subsequently removing the solvent so as to form a porous layer, pressure-bonding the porous layer to the base material, and peeling the support off, (iii) applying the coating solution to a surface of a suitable support, pressure-bonding the base material to a coating surface, peeling the support off, and then removing the solvent, or (iv) carrying out dip coating by immersing the base material into the coating solution, and then removing the solvent.

The solvent preferably (i) does not have an adverse effect on the base material, (ii) allows the resin to be uniformly and stably dissolved in the solvent, and (iii) allows the filler to be uniformly and stably dispersed in the solvent. Examples of the solvent encompass N-methyl-2-pyrrolidone, N,N-dimethylacetamide, N,N-dimethylformamide, acetone, and water.

As necessary, the coating solution may contain, as a component(s) other than the resin and the filler, for example, a dispersing agent, a plasticizer, a surfactant, and/or a pH adjusting agent.

Examples of the base material other than the polyolefin porous film encompass a film other than the polyolefin porous film, a positive electrode, and a negative electrode.

The coating solution can be applied to the base material by a conventionally known method. Specific examples of such a method encompass a gravure coater method, a dip coater method, a bar coater method, and a die coater method.

In a case where the coating solution includes an aramid resin, the aramid resin can be deposited by applying moisture to the coating surface. The porous layer can be formed in this way. The specific method of applying moisture to the coating surface is applied is not particularly limited, but possible examples encompass (i) exposing the coating surface to a high humidity environment, (ii) spraying water, and (iii) blowing water vapor onto the surface with use of e.g. a nozzle.

Examples of a method of preparing the aramid resin encompass, but are not particularly limited to, condensation polymerization of para-oriented aromatic diamine and para-oriented aromatic dicarboxylic acid halide. In such a method, the aramid resin obtained is substantially composed of repeating units in which amide bonds occur at para or quasi-para positions of the aromatic ring. "Quasi-para positions" refers to positions at which bonds extend in opposing directions from each other, coaxially or in parallel, such as 4 and 4' positions of biphenylene, 1 and 5 positions of naphthalene, and 2 and 6 positions of naphthalene.

A solution of poly(paraphenylene terephthalamide) can be prepared by, for example, a method including the following specific steps (I) through (IV).

(I) N-methyl-2-pyrrolidone is introduced into a dried flask. Then, calcium chloride which has been dried at 200° C. for 2 hours is added. Then, the flask is heated to 100° C. to completely dissolve the calcium chloride.

(II) The solution obtained in the step (I) is returned to room temperature, and then paraphenylenediamine is added and completely dissolved.

(III) While a temperature of the solution obtained in the step (II) is maintained at 20±2° C., terephthalic acid dichloride is added, the terephthalic acid dichloride being divided into 10 separate identical portions added at approximately 5-minute intervals.

(IV) While a temperature of the solution obtained in the step (III) is maintained at 20±2° C., the solution is matured for 1 hour, and is then stirred under reduced pressure for 30 minutes to eliminate air bubbles, so that the solution of the poly(paraphenylene terephthalamide) is obtained.

In an embodiment of the present invention, in addition to controlling the above-described filler particle diameter and amount of resin, controlling dissolved oxygen concentration during polymerization of the resin makes it possible to obtain a porous layer having the above-described shear modulus. The dissolved oxygen concentration is preferably less than 10%, more preferably not more than 8%, and even more preferably not more than 5%. Setting the dissolved oxygen concentration to be less than 10% makes it possible to reduce or prevent oxidation polymerization of molecules that can become the starting point of a branched structure, and therefore makes it possible to increase the cohesive force of molecules.

For example, in the method of preparing the poly(paraphenylene terephthalamide), in step (III) (in which terephthalic acid dichloride is added to a paraphenylenediamine solution) it is preferable to control the dissolved oxygen concentration in the solution. For example, it is possible to control the dissolved oxygen concentration by controlling the amount of nitrogen introduced during polymerization. In a case where the dissolved oxygen concentration is high, part of the paraphenylenediamine will undergo oxidation polymerization. This can result in the production of a branched structure in the poly(paraphenylene terephthalamide). This branched structure can inhibit packing of molecules. In a case where the dissolved oxygen concentration is low, it is easy for a crystalline structure of the poly(paraphenylene terephthalamide) to develop, in which branching is controlled. These crystals are packed closely. As such, a porous layer produced under conditions where the dissolved oxygen concentration is low tends to have a higher shear modulus. Note that a decrease in cohesive force due to a branched structure occurs also in resins other than aramid resins. As such, in resins other than aramid resins as well, preventing the production of a branched structure makes it possible to increase cohesive force.

[3. Nonaqueous Electrolyte Secondary Battery Laminated Separator]

A laminated separator for a nonaqueous electrolyte secondary battery (herein also referred to as a "nonaqueous electrolyte secondary battery laminated separator") in accordance with an embodiment of the present invention includes: a polyolefin porous film; and the above-described nonaqueous electrolyte secondary battery porous layer, the nonaqueous electrolyte secondary battery porous layer being formed on at least one surface of the polyolefin porous film. Hereinafter, a nonaqueous electrolyte secondary battery laminated separator may also be referred to simply as a "laminated separator".

The laminated separator has an air permeability of preferably 30 s/100 mL to 1000 s/100 mL, and more preferably 50 s/100 mL to 800 s/100 mL, in terms of Gurley values. The laminated separator having an air permeability falling within the above range makes it possible for the laminated separator to achieve sufficient ion permeability in a nonaqueous electrolyte secondary battery.

<Polyolefin Porous Film>

Hereinafter, a polyolefin porous film may be referred to simply as a "porous film". The porous film contains a polyolefin-based resin as a main component and has therein many pores connected to one another, so that gas and liquid can pass through the porous film from one surface to the other. A polyolefin porous film can serve as a base material for a laminated separator in which a porous layer (described later) is formed.

The porous film contains polyolefin at a proportion of not less than 50% by volume, preferably not less than 90% by volume, and more preferably not less than 95% by volume, relative to the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a high molecular weight component improves the strength of a resultant nonaqueous electrolyte secondary battery separator.

Examples of the polyolefin (thermoplastic resin) encompass a homopolymer or a copolymer each produced by polymerizing a monomer such as ethylene, propylene, 1-butene, 4-methyl-1-pentene, and 1-hexene. Examples of the homopolymer encompass polyethylene, polypropylene, and polybutene. Examples of the copolymer encompass an ethylene-propylene copolymer.

Among the above examples, polyethylene is more preferable as it is capable of preventing a flow of an excessively large electric current at a lower temperature. This preventing of an excessively large electric current is also referred to as shutdown. Examples of the polyethylene encompass low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000, 000 is preferable.

The porous film has a thickness of preferably 4 μm to 40 μm, more preferably 5 μm to 30 μm, and even more preferably 6 μm to 15 μm.

A weight per unit area of the porous film can be set as appropriate in view of strength, thickness, weight, and handleability. Note, however, that the weight per unit area of the porous film is preferably 4 g/m$^2$ to 20 g/m$^2$, more preferably 4 g/m$^2$ to 12 g/m$^2$, and even more preferably 5 g/m$^2$ to 10 g/m$^2$, so as to allow the nonaqueous electrolyte secondary battery to have a higher weight energy density and a higher volume energy density.

The porous film has an air permeability of preferably 30 s/100 mL to 500 s/100 mL, and more preferably 50 s/100 mL to 300 s/100 mL, in terms of Gurley values. A porous film having the above air permeability can achieve sufficient ion permeability.

The porous film has a porosity of preferably 20% by volume to 80% by volume, and more preferably 30% by volume to 75% by volume, so as to (i) retain an electrolyte in a larger amount and (ii) obtain a function of reliably preventing a flow of an excessively large electric current at a lower temperature. Further, in order to achieve sufficient ion permeability and prevent particles from entering the positive electrode and/or the negative electrode, the porous film has pores each having a pore size of preferably not more than 0.3 μm, and more preferably not more than 0.14 μm.

[4. Method of Producing Nonaqueous Electrolyte Secondary Battery Laminated Separator]

A method of producing the nonaqueous electrolyte secondary battery laminated separator in accordance with an embodiment of the present invention can be, for example, a method in which, in the above-described method for producing the nonaqueous electrolyte secondary battery porous layer, the above-described polyolefin porous film is used as the base material which is coated with the coating solution. Note that, herein, a direction in which the porous film or laminated separator is transferred during production may also be referred to as a "machine direction" (MD), and a direction which is (i) parallel to the surface of the porous film or laminated separator and (ii) perpendicular to the MD may also be referred to as a "transverse direction" (TD).

A method of producing the porous film is not particularly limited. For example, the polyolefin porous film can be produced by a method as follows. First, polyolefin-based resin is kneaded together with a pore forming agent such as an inorganic bulking agent or a plasticizer, and optionally with another agent(s) such as an antioxidant. After kneading, the kneaded substances are extruded so as to produce a polyolefin resin composition in sheet form. The pore forming agent is then removed from the polyolefin resin composition in sheet form with use of a suitable solvent. After the pore forming agent is removed, the polyolefin resin composition is stretched so that a polyolefin porous film is obtained.

The inorganic bulking agent is not particularly limited. Examples of the inorganic bulking agent encompass inorganic fillers; one specific example is calcium carbonate. The plasticizing agent is exemplified by, but not particularly limited to, a low molecular weight hydrocarbon such as liquid paraffin.

Examples of methods for producing the porous film encompass a method including the following steps.

(A) Obtaining a polyolefin resin composition by kneading ultra-high molecular weight polyethylene, low molecular weight polyethylene having a weight-average molecular weight of not more than 10,000, a pore forming agent such as calcium carbonate or a plasticizer, and an antioxidant;
(B) Forming a sheet by (i) rolling the polyolefin resin composition with use of a pair of reduction rollers and (ii) cooling the polyolefin resin composition in stages while tensioning the polyolefin resin composition with use of a take-up roller whose velocity ratio differs from that of the reduction rollers;
(C) Removing the pore forming agent from the sheet with use of a suitable solvent; and
(D) Stretching the sheet, from which the pore forming agent has been removed, with use of a suitable stretch ratio.

[5. Nonaqueous Electrolyte Secondary Battery Member, Nonaqueous Electrolyte Secondary Battery]

A member for a nonaqueous electrolyte secondary battery (herein also referred to as a "nonaqueous electrolyte secondary battery member") in accordance with an embodiment of the present invention includes: a positive electrode; the above-described nonaqueous electrolyte secondary battery porous layer or nonaqueous electrolyte secondary battery laminated separator; and a negative electrode, the positive electrode, the nonaqueous electrolyte secondary battery porous layer or nonaqueous electrolyte secondary battery laminated separator, and the negative electrode being arranged in this order. A nonaqueous electrolyte secondary battery in accordance with an embodiment of the present invention includes the above-described nonaqueous electrolyte secondary battery porous layer or nonaqueous electrolyte secondary battery laminated separator. The nonaqueous electrolyte secondary battery is not particularly limited in shape and can have any shape such as the shape of a thin plate (sheet), a disk, a cylinder, or a prism such as a cuboid.

The nonaqueous electrolyte secondary battery can be produced by a publicly known conventional method. As one example, first, a nonaqueous electrolyte secondary battery member is formed by providing a positive electrode, the polyolefin porous film, and a negative electrode in this order. The porous layer can be provided between the polyolefin porous film and at least one of the positive electrode and the negative electrode. Next, the nonaqueous electrolyte secondary battery member is inserted into a container which serves as a housing for the nonaqueous electrolyte secondary battery. The container is then filled with nonaqueous electrolyte, and then hermetically sealed while pressure is reduced in the container. In this way, the nonaqueous electrolyte secondary battery can be produced.

<Positive Electrode>

The positive electrode employed in an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer, containing a positive electrode active material and a binding agent, is formed on a positive electrode current collector. The active material layer may further contain an electrically conductive agent.

Examples of the positive electrode active material encompass materials each capable of being doped with and dedoped of metal ions such as lithium ions or sodium ions. Specific examples of the materials encompass lithium complex oxides each containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use only one of the above electrically conductive agents, or two or more of the above electrically conductive agents in combination.

Examples of the binding agent encompass: fluorine-based resins such as polyvinylidene fluoride (PVDF); acrylic resin; and styrene butadiene rubber. Note that the binding agent serves also as a thickener.

Examples of positive electrode current collector encompass electric conductors such as Al, Ni, and stainless steel. Of these electric conductors, Al is more preferable because Al is easily processed into a thin film and is inexpensive.

Examples of a method for producing the positive electrode sheet encompass: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

<Negative Electrode>

The negative electrode employed in an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer, containing a negative electrode active material and a binding agent, is formed on a negative electrode current collector. The active material layer may further contain an electrically conductive agent.

Examples of the negative electrode active material encompass materials each capable of being doped with and dedoped of metal ions such as lithium ions or sodium ions. Examples of the materials encompass carbonaceous materials. Examples of the carbonaceous materials encompass natural graphite, artificial graphite, cokes, carbon black, and pyrolytic carbons.

Examples of the negative electrode current collector encompass Cu, Ni, and stainless steel. Of these materials, Cu is more preferable because Cu is not easily alloyed with lithium and is easily processed into a thin film.

Examples of a method for producing the negative electrode sheet encompass: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressure is applied so that the paste is firmly fixed to the negative electrode current collector. The paste preferably contains an electrically conductive agent as described above and a binding agent as described above.

<Nonaqueous Electrolyte>

A nonaqueous electrolyte for an embodiment of the present invention is not limited to any particular one, provided that the nonaqueous electrolyte is one that is generally used for a nonaqueous electrolyte secondary battery. The nonaqueous electrolyte can be, for example, a nonaqueous electrolyte containing an organic solvent and a lithium salt dissolved therein. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one of the above lithium salts or two or more of the above lithium salts in combination.

Examples of the organic solvent to be contained in the nonaqueous electrolyte encompass carbonates, ethers, esters, nitriles, amides, carbamates, sulfur-containing compounds, and fluorine-containing organic solvents each obtained by introducing a fluorine group into any of these organic solvents. It is possible to use only one of the above organic solvents or two or more of the above organic solvents in combination.

EXAMPLES

The present invention will be described below in more detail with reference to Examples and Comparative Examples. Note, however, that the present invention is not limited to such Examples.

[Measurement Methods]

The methods used for various measurements in the Examples and Comparative Example are as follows.

<Air Permeability of Laminated Separator>

The air permeability of the laminated separator was measured in conformance with JIS P8117.

<Thickness of Porous Layer>

The thickness of the laminated separator was measured with use of a high-precision digital measuring device manufactured by Mitutoyo Corporation. Thereafter, peel-off tape was affixed to a porous layer side of the laminated separator, and then the porous layer was peeled off from a polyethylene porous film of the laminator separator. The thickness of the polyethylene porous film from which the porous layer was peeled was then measured in the same manner as for the laminated separator. The thickness of the porous layer was calculated by subtracting (i) the thickness of the polyethylene porous film (from which the porous layer was peeled) from (ii) the thickness of the laminated separator.

<Elastic Modulus in Shear Direction>

A glass epoxy resin substrate measuring 50 mm in length by 30 mm in width by 2 mm in thickness was used. A piece of double-sided tape (Nice Tack (trademark) NW-10, manufactured by Nichiban Co., Ltd.) measuring 10 mm in width was affixed to one lengthwise end of the resin substrate, with care being taken so as to avoid wrinkles in the tape. The double-sided tape was affixed such that the widthwise direction of the double-sided tape was parallel to the lengthwise direction of the resin substrate. A region of the resin substrate to which the double-sided tape was affixed measured 10 mm (in the lengthwise direction of the resin substrate) by 30 mm (in the widthwise direction of the resin substrate). Two resin substrates were prepared in the above manner for each Example and Comparative Example subject to measurement. Hereinafter, these two resin substrates may also be referred to respectively as a resin substrate (1) and a resin substrate (2).

Next, a peel-off film on the back side of the double-sided tape on the resin substrate (1) was removed to expose the adhesive surface of the tape. The porous-layer-side surface of a laminated separator (50 mm×50 mm) was affixed to the adhesive surface, with care being taken to avoid wrinkling or air bubbles. The laminated separator was affixed such that the MD of the laminated separator was parallel to the lengthwise direction of the resin substrate (1). After affixing the laminated separator, a 5 kg load was applied to the area of affixation for 30 minutes. Thereafter, while the resin substrate (1) was held down, the porous layer was separated from the base material of the laminated separator. In other words, the polyethylene porous film serving as the base material of the laminated separator was peeled off from the porous layer, in a manner so that the porous layer remained affixed to the resin substrate (1). After the peeling, it was confirmed that there were no cracks in surface of the porous layer and that the porous layer was intact. The size of the porous layer which had been thus separated was the same as the area of the resin substrate to which the double-sided tape was affixed, i.e., 10 mm (in the lengthwise direction of the resin substrate) by 30 mm (in the widthwise direction of the resin substrate).

Next, a peel-off film on the back side of the double-sided tape on the resin substrate (2) was removed to expose the adhesive surface. This adhesive surface was affixed to the surface of the porous layer affixed to the resin substrate (1). Thereafter, a 5 kg load was applied to the area of affixation for 30 minutes. Next, the load was removed, and the test piece was further allowed to stand for 24 hours in an environment at 23° C. The test piece produced in this manner was used in measurements. This test piece is illustrated in the Figure as the test piece 100.

A tension test was carried out in accordance with the method in JIS K6850. A tension test device (Tensilon Universal Material Testing Instrument RTG-1310, manufactured by A&D Company, Limited) was used for the test. Test conditions were: temperature: 23° C.; and pulling speed: 50 mm/s. In the tension test, the test piece was pulled in the lengthwise direction. The elastic modulus in the shear direction was then calculated from the slope of the resulting stress-strain curve in a range where stress was 50 MPa to 200 MPa. Measurement was carried out twice for each Example and Comparative Example. For each Example and Comparative Example, the two elastic moduli in the shear direction calculated as above were averaged, and the average value was used as the elastic modulus in the shear direction for that Example/Comparative Example.

<Heat Resistance Evaluation (Heat Shrink Test)>

A laminated separator cut to a size of 108 mm in length by 54 mm in width was placed on a glass plate, such that a polyethylene porous film side of the laminated separator faced down. Both lengthwise ends of the laminated separator were fixed to the glass plate with polyimide adhesive tape manufactured by Nitto Denko Corporation. At each lengthwise end of the laminated separator, the tape covered 4 mm of the laminated separator in the lengthwise direction. In other words, the portion of the laminated separator which was subject to measurement was 100 mm in length. The width of the laminated separator in this state was measured at a center part of the laminated separator. This width was considered to be L1. Next, the glass plate was introduced into a heating oven set to 200° C. and was heated for 5 minutes. Thereafter, the glass plate was removed from the oven and allowed to sit until the glass plate reached room temperature. Next, the width of the laminated separator was measured at a center part of the glass plate. This width was considered to be L2. A "shape retention ratio upon heating" was then calculated using the formula below.

Shape retention ratio upon heating [%]=(L2/L1)×100

Measurement was carried out three times for each Example and Comparative Example. For each Example and Comparative Example, the results of the three measurements were averaged, and the average value was used as the shape retention ratio upon heating of that Example/Comparative Example.

<Measurement of Dissolved Oxygen Concentration During Polymerization>

When measuring the dissolved oxygen concentration during preparation of the poly(paraphenylene terephthalamide) (described later), a rubber septum cap was fitted to the lid of the separable flask that was used. A reaction device was assembled such that nitrogen or a mixture of nitrogen and air was supplied from one direction, flowed through the separable flask, and flowed out toward another direction. The needle of a suction syringe connected to an oxygen concentration meter (Pack Keeper RO-103KS, manufactured by Iijima Denshi Kogyo) was stuck through the septum cap, and the concentration of gaseous oxygen was measured. Because the first measurement is insufficient to completely replace the gas in the oxygen concentration meter, a plurality of measurements were performed. A stable measured value obtained from a second or later measurement was used as the oxygen concentration. In a state of equilibrium, gaseous oxygen concentration is approximately equal to the dissolved oxygen concentration. As such, it is possible to use the oxygen concentration meter to determine the dissolved oxygen concentration in an indirect manner.

Example 1

Poly(paraphenylene terephthalamide) was produced with use of a 3-liter separable flask having a stirring blade, a thermometer, a nitrogen inflow tube, and a powder addition port. The separable flask was dried sufficiently, and then 2200 g of N-methyl-2-pyrrolidone (NMP) was introduced therein. Next, 151.07 g of calcium chloride powder which had been vacuum dried at 200° C. for 2 hours was added. Thereafter, the flask was heated to 100° C. to completely dissolve the calcium chloride powder. The flask was returned to room temperature, and then 68.23 g of paraphenylenediamine was added and completely dissolved. While a temperature of this solution was maintained at 20±2° C. and a dissolved oxygen concentration during polymerization was maintained at 0.5%, 124.97 g of terephthalic acid dichloride was added. Specifically, the terephthalic acid dichloride was divided into 10 separate identical portions which were added at approximately 5-minute intervals. The solution was then matured by stirring the solution for 1 hour while maintaining a temperature of 20±2° C. Thereafter, the solution was filtered through a 1500-mesh stainless steel gauze. The resulting solution had a poly(paraphenylene terephthalamide) concentration of 6 weight %.

Next, 100 g of this poly(paraphenylene terephthalamide) solution was weighed out into a flask. Thereafter, 300 g of NMP was added so as to obtain a solution in which the concentration of poly(paraphenylene terephthalamide) was 1.5 weight %. The solution (in which the concentration of poly(paraphenylene terephthalamide) was 1.5 weight %) was stirred for 60 minutes. Thereafter, 6 g of Alumina C (manufactured by Nippon Aerosil Co., Ltd.) was added to the solution, and stirring was performed for 240 minutes. A resultant solution was filtered through a 1000-mesh metal gauze. Thereafter, 0.73 g of calcium carbonate was added, followed by 240 minutes of stirring to achieve neutralization. A resultant solution was then defoamed under reduced pressure, so that a coating solution slurry was obtained.

The coating solution slurry was continuously coated onto a polyethylene porous film measuring 10 μm in thickness. A coating film thus formed was then brought into an atmosphere having a temperature 50° C. and a relative humidity of 70%, so that the poly(paraphenylene terephthalamide) was deposited. Next, the coating film from which the poly(paraphenylene terephthalamide) was deposited was rinsed with water, and then drying was performed. A laminated separator was thus obtained. The laminated separator obtained had a thickness of 12.8 μm and an air permeability of 197 s/100 mL.

Example 2

A laminated separator was produced in a manner similar to Example 1, except that the amount of Alumina C added was 3 g. The laminated separator obtained had a thickness of 12.1 μm and an air permeability of 217 s/100 mL.

Example 3

A laminated separator was produced in a manner similar to Example 1, except that the amount of Alumina C added was 2 g. The laminated separator obtained had a thickness of 11.9 μm and an air permeability of 258 s/100 mL.

Comparative Example 11

A laminated separator was produced in a manner similar to Example 1, except that (i) a polyethylene porous film having a thickness of 12 μm was used, (ii) the dissolved oxygen concentration during polymerization was 10%, and (iii) in addition to the 6 g of Alumina C, 6 g of Advanced Alumina AA-03 (manufactured by Sumitomo Chemical Co., Ltd.) was added. The laminated separator obtained had a thickness of 14.8 μm and an air permeability of 241 s/100 mL.

Comparative Example 21

A laminated separator was produced in a manner similar to Example 1, except that the dissolved oxygen concentration during polymerization was 10%. The laminated separator obtained had a thickness of 12.6 μm and an air permeability of 195 s/100 mL.

Comparative Example 3

A laminated separator was produced in a manner similar to Example 1, except that (i) a polyethylene porous film having a thickness of 12 μm was used, and (ii) Alumina C was not added. The laminated separator obtained had a thickness of 13.9 μm and an air permeability of 572 s/100 mL.

[Results]

Measurement results are shown below. Note that in Table 1, "Ar", "AA", and "AlC" stand for "aramid resin", "Advanced Alumina AA-03", and "Alumina C", respectively. Advanced Alumina AA-03 has a particle diameter of approximately 0.3 μm. Alumina C has a particle diameter of approximately 0.02 μm.

From Table 1, it can be seen that it is possible to control the shear modulus of a porous layer by controlling (i) dissolved oxygen concentration during polymerization, (ii) the particle diameter of the filler, and (iii) the ratio of resin. Examples 1 to 3, each of which has a shear modulus of not less than 16 GPa, had a higher shape retention ratio upon heating than Comparative Examples 1 to 3, each of which had a shear modulus of less than 16 GPa. From the air permeability values, it can be seen that Examples 1 to 3 maintained favorable ion permeability. As such, it was found that the porous layers of Examples 1 to 3, which had a shear modulus of not less than 16 GPa, have superior ion permeability and superior heat resistance despite being thin.

Comparative Example 2 had a higher ratio of aramid resin than Comparative Example 1, and did not contain Advanced Alumina AA-03, which has a large particle diameter. Presumably for these reasons, Comparative Example 2 had a higher shear modulus than Comparative Example 1. Even so, the shear modulus of Comparative Example 2 was still only 13 GPa. This is presumably because the dissolved oxygen concentration during polymerization was high. Comparative Example 3 had a lower dissolved oxygen concentration during polymerization but contained no filler. Comparative Example 3 had a high air permeability, and its base material shrunk to such a large degree that the shape retention ratio upon heating could not be measured.

INDUSTRIAL APPLICABILITY

The present invention can be applied in the production of a nonaqueous electrolyte secondary battery laminated separator which has both favorable ion permeability and favorable heat resistance despite being thin.

REFERENCE SIGNS LIST

1: Porous layer

The invention claimed is:

1. A nonaqueous electrolyte secondary battery porous layer,
the nonaqueous electrolyte secondary battery porous layer consisting essentially of a filler and a resin, an amount of the resin with respect to a total amount of the filler and the resin being not less than 40 weight %, a particle diameter of the filler being not less than 0.015 μm and not more than 0.2 μm, and

TABLE 1

| Sample | | Dissolved oxygen concentration (%) | Aramid ratio (weight %) | Thickness of porous layer (μm) | Shear modulus (GPa) | Air permeability (s/100 mL) | Shape retention ratio upon heating to 200° C. (%) |
|---|---|---|---|---|---|---|---|
| Comparative Example 1 | Ar/AA/AlC = 1/1/1 | 10 | 33 | 2.6 | 12 | 241 | 69.2 |
| Comparative Example 2 | Ar/AlC = 1/1 | 10 | 50 | 2.6 | 13 | 195 | 76.0 |
| Example 1 | Ar/AlC = 1/1 | 0.5 | 50 | 2.5 | 17 | 197 | 81.5 |
| Example 2 | Ar/AlC = 2/1 | 0.5 | 66 | 1.7 | 23 | 217 | 82.9 |
| Example 3 | Ar/AlC = 3/1 | 0.5 | 75 | 1.6 | 25 | 258 | 83.1 |
| Comparative Example 3 | No filler contained | 0.5 | 100 | 2.4 | 15 | 572 | Could not be measured | the nonaqueous electrolyte secondary battery porous layer having a thickness of not more than 3 µm and an elastic modulus in a shear direction of not less than 16 GPa.

2. The nonaqueous electrolyte secondary battery porous layer according to claim 1, wherein the nonaqueous electrolyte secondary battery porous layer has a porosity of 20% by volume to 90% by volume.

3. The nonaqueous electrolyte secondary battery porous layer according to claim 1, wherein the nonaqueous electrolyte secondary battery porous layer contains at least one resin selected from a group consisting of a polyamide-based resin, a polyimide-based resin, and a polyester-based resin.

4. The nonaqueous electrolyte secondary battery porous layer according to claim 1, wherein the nonaqueous electrolyte secondary battery porous layer contains a polyamide-based resin.

5. A nonaqueous electrolyte secondary battery laminated separator comprising:
   a polyolefin porous film; and
   the nonaqueous electrolyte secondary battery porous layer according to claim 1, the nonaqueous electrolyte secondary battery porous layer being formed on at least one surface of the polyolefin porous film.

6. A nonaqueous electrolyte secondary battery member comprising:
   a positive electrode;
   the nonaqueous electrolyte secondary battery laminated separator according to claim 5; and
   a negative electrode,
   the positive electrode, the nonaqueous electrolyte secondary battery laminated separator, and the negative electrode being arranged in this order.

7. A nonaqueous electrolyte secondary battery comprising:
   the nonaqueous electrolyte secondary battery laminated separator according to claim 5.

8. A nonaqueous electrolyte secondary battery member comprising:
   a positive electrode;
   the nonaqueous electrolyte secondary battery porous layer according to claim 1; and
   a negative electrode,
   the positive electrode, the nonaqueous electrolyte secondary battery porous layer, and the negative electrode being arranged in this order.

9. A nonaqueous electrolyte secondary battery comprising:
   the nonaqueous electrolyte secondary battery porous layer according to claim 1.

10. The nonaqueous electrolyte secondary battery porous layer according to claim 1, wherein the resin has a melting point or a glass transition temperature of not lower than 180° C.

* * * * *